United States Patent
Tipton et al.

(10) Patent No.: US 9,210,613 B2
(45) Date of Patent: Dec. 8, 2015

(54) METHOD AND APPARATUS FOR USING A LOCAL AREA NETWORK TO OFFLOAD DEMAND OF A WIDE AREA NETWORK

(71) Applicant: AT&T Intellectual Property I, L.P., Atlanta, GA (US)

(72) Inventors: Rick Tipton, Corryton, TN (US); Mark Austin, Roswell, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 101 days.

(21) Appl. No.: 14/085,062

(22) Filed: Nov. 20, 2013

(65) Prior Publication Data

US 2015/0138962 A1    May 21, 2015

(51) Int. Cl.
| | |
|---|---|
| *H04W 28/08* | (2009.01) |
| *H04W 28/02* | (2009.01) |
| *H04W 24/02* | (2009.01) |
| *H04W 36/22* | (2009.01) |
| *H04W 92/02* | (2009.01) |

(52) U.S. Cl.
CPC ............. *H04W 28/08* (2013.01); *H04W 24/02* (2013.01); *H04W 28/0236* (2013.01); *H04W 28/0284* (2013.01); *H04W 36/22* (2013.01); *H04W 92/02* (2013.01)

(58) Field of Classification Search
None
See application file for complete search history.

(56) References Cited

U.S. PATENT DOCUMENTS

| | | | |
|---|---|---|---|
| 7,054,627 B1 | 5/2006 | Hillman | |
| 7,269,155 B2 | 9/2007 | Joshi | |
| 7,453,858 B2 | 11/2008 | Csapo et al. | |
| 8,009,644 B2 | 8/2011 | Kuo et al. | |
| 8,116,285 B1 | 2/2012 | Barnum | |
| 8,121,642 B2 | 2/2012 | James et al. | |
| 2010/0304738 A1* | 12/2010 | Lim | 455/426.1 |
| 2011/0116452 A1 | 5/2011 | Welch et al. | |
| 2011/0211444 A1* | 9/2011 | Das et al. | 370/219 |
| 2011/0235594 A1 | 9/2011 | Su | |
| 2012/0257512 A1* | 10/2012 | Lim | 370/242 |

(Continued)

FOREIGN PATENT DOCUMENTS

| | | |
|---|---|---|
| CN | 102547758 A | 7/2012 |
| WO | 2006008324 A1 | 1/2006 |
| WO | 2013100629 A1 | 7/2013 |

OTHER PUBLICATIONS

"Cisco Connected Stadium Wi-Fi for Sports and Entertainment Venues", White Paper, 2011, Cisco Systems, Inc., San Jose, CA, 8 pages.

(Continued)

*Primary Examiner* — Bunjob Jaroenchonwanit
(74) *Attorney, Agent, or Firm* — Toler Law Group, PC

(57) ABSTRACT

A method includes receiving, at a first computing device, first data associated with a performance indicator of a wireless wide area network for a first time period. The method also includes determining, at the first computing device, whether the performance indicator satisfies a performance threshold. The method further includes, based on determining that the performance indicator does not satisfy the performance threshold, offloading one or more communication devices from the wireless wide area network so that the performance indicator satisfies the performance threshold. The method finally includes sending a first instruction to a second computing device. The second computing device enables one or more access points to provide mobile communication services to the one or more communication devices.

20 Claims, 3 Drawing Sheets

(56) References Cited

U.S. PATENT DOCUMENTS

| | | | |
|---|---|---|---|
| 2013/0044741 A1* | 2/2013 | Lappetelainen et al. | 370/338 |
| 2013/0083661 A1* | 4/2013 | Gupta et al. | 370/235 |
| 2013/0201842 A1* | 8/2013 | Chou et al. | 370/252 |
| 2014/0003239 A1* | 1/2014 | Etemad et al. | 370/235 |
| 2014/0023041 A1* | 1/2014 | Zhao et al. | 370/331 |
| 2014/0050086 A1* | 2/2014 | Himayat et al. | 370/230 |
| 2014/0064068 A1* | 3/2014 | Horn et al. | 370/230 |
| 2014/0101726 A1* | 4/2014 | Gupta et al. | 726/4 |
| 2014/0133294 A1* | 5/2014 | Horn et al. | 370/230 |
| 2014/0369201 A1* | 12/2014 | Gupta et al. | 370/235 |

OTHER PUBLICATIONS

"Dual-radio, Three-stream 802.11n Wireless Access Point", Meru Networks, 2012, Meru Networks, Inc., Sunnyvale, CA, 3 pages.

International Search Report and Written Opinion for International Application No. PCT/US2014/064652 mailed Feb. 11, 2015, 8 pages.

* cited by examiner

METHOD AND APPARATUS FOR USING A LOCAL AREA NETWORK TO OFFLOAD DEMAND OF A WIDE AREA NETWORK

I. FIELD

The present disclosure is generally related to a method of using a local area network to offload demand of a wide area network.

II. DESCRIPTION OF RELATED ART

Demand for mobile communication services (e.g., audio, video, text, images, other data, or any combination thereof) on a wireless wide area network (e.g., a cellular network) may be difficult to predict at a specific time of a day. For example, at a large event venue (such as a stadium), day-to-day service demand on a wireless wide area network may be relatively stable and low. However, when the event venue hosts an event (such as a sports game), a large number of people may be present in the event venue to observe the event, resulting in high service demand on the wireless wide area network.

The amount of demand may be above a capacity (e.g., loading conditions and bandwidth) that the wireless wide area network is able to provide. When the amount of demand exceeds the capacity, the mobile communication services provided to communication devices (e.g., a wireless phone, a smart phone, a portable computing device, or any combination thereof) may start to deteriorate, which may lead to customer dissatisfaction if the issue is not promptly addressed. However, unlimited addition of resources to accommodate such demand fluctuations may not be a cost effective solution to the mobile communication service provider since many of the resources are unused or underutilized during non-event times.

III. BRIEF DESCRIPTION OF THE DRAWINGS

Figure 1:
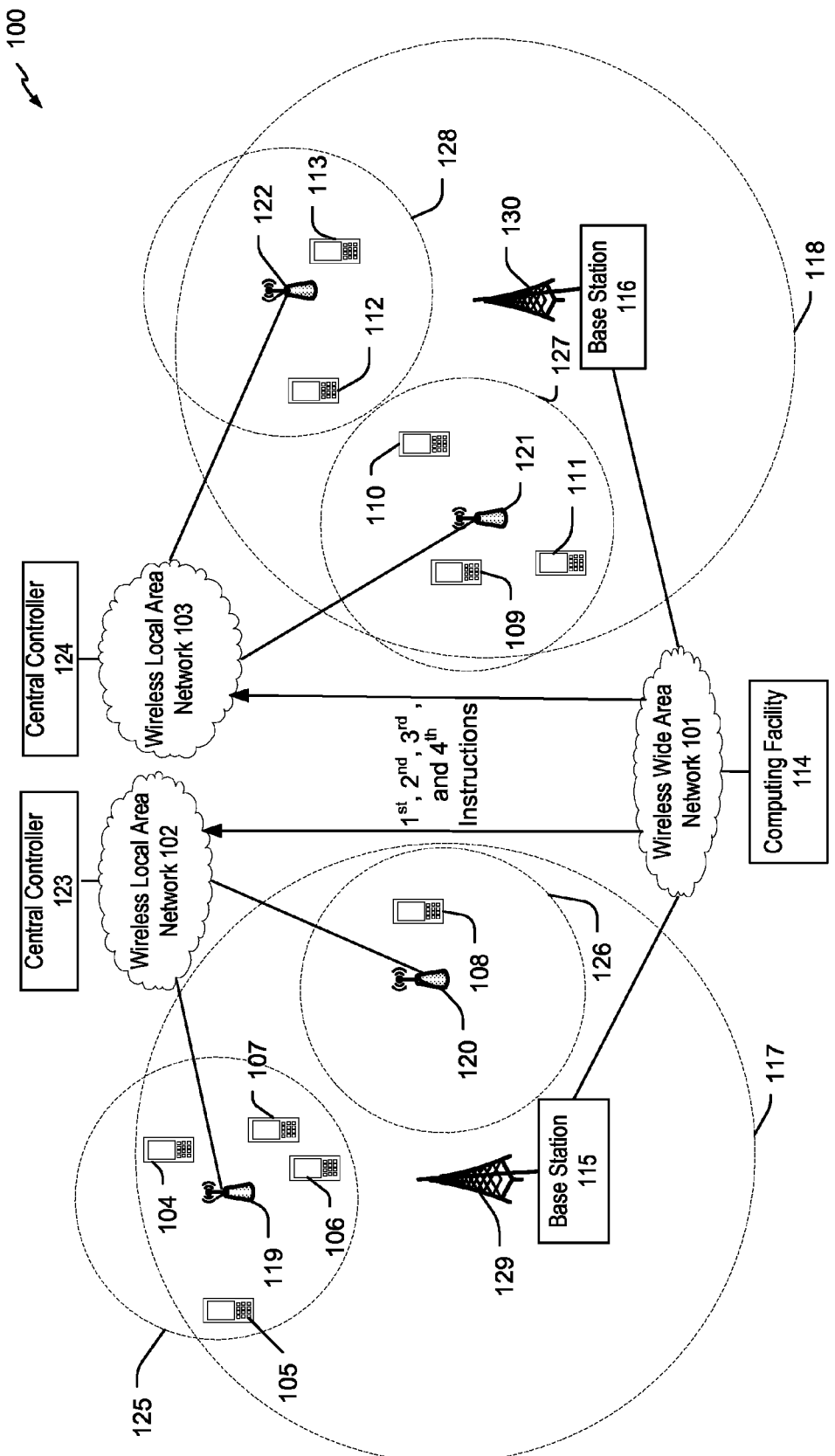
Figure 2:
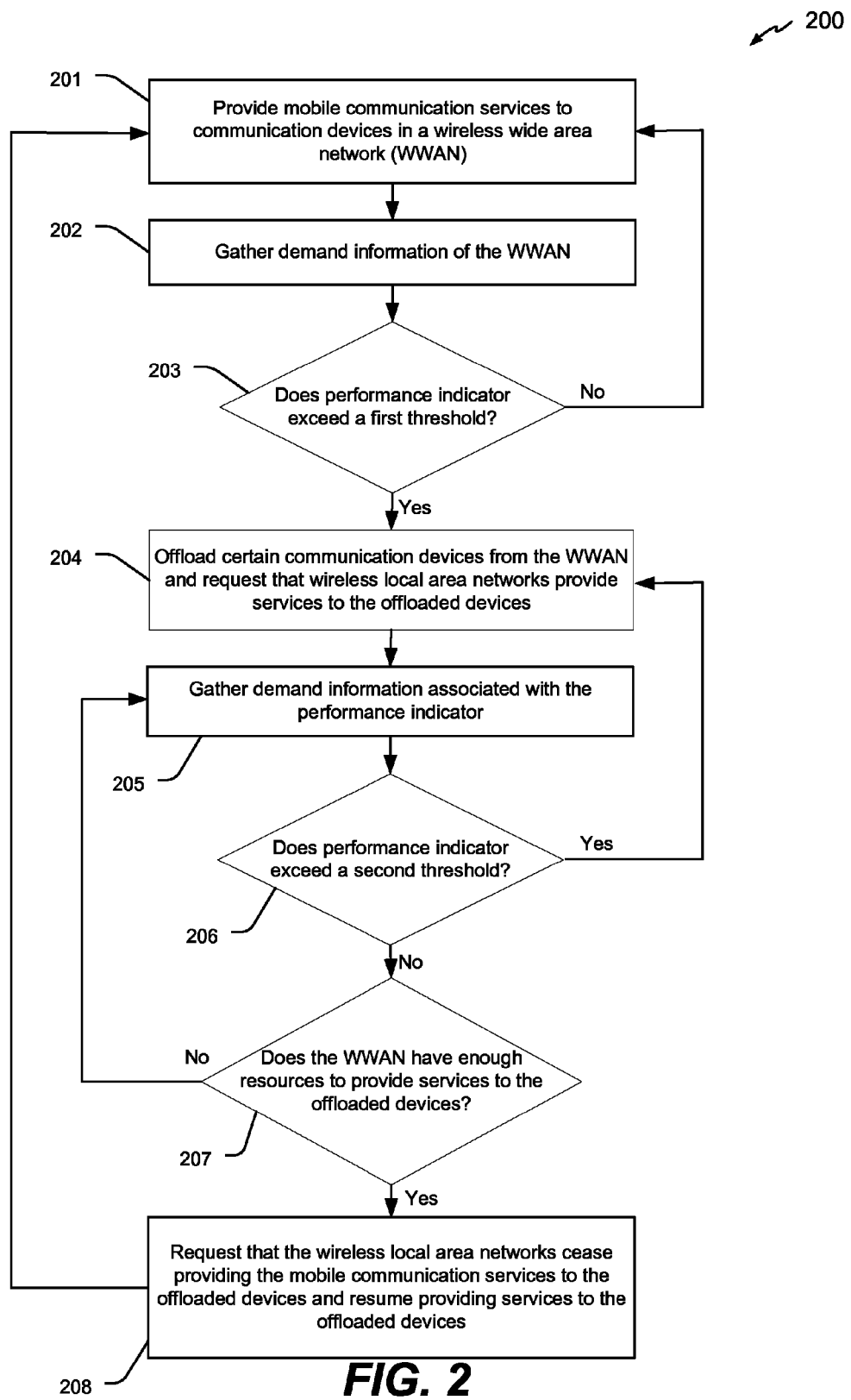
Figure 3:
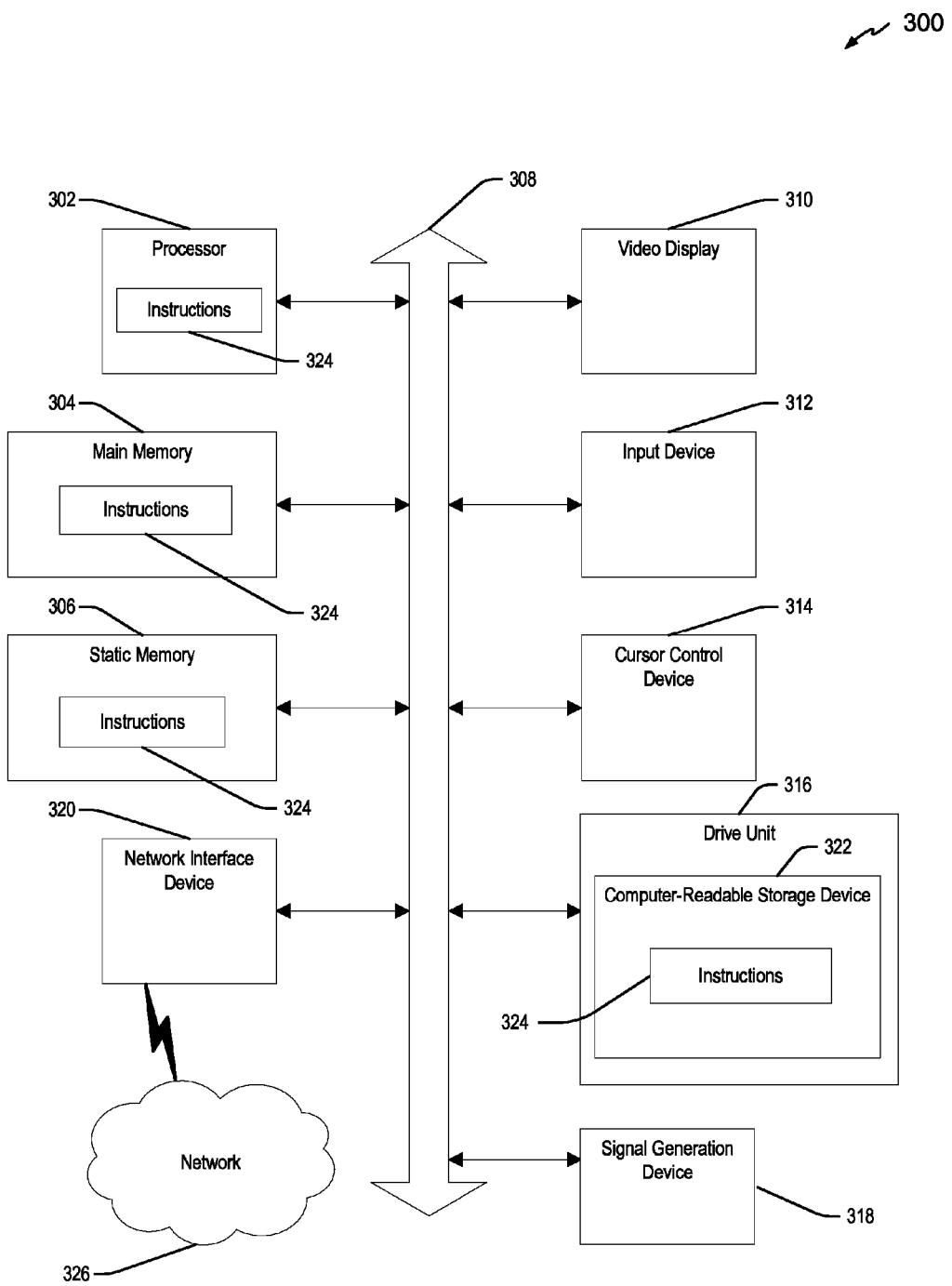

FIG. 1 is a block diagram of a particular embodiment of a system that uses wireless local area networks to provide mobile communication services to communication devices to relieve a wireless wide area network;

FIG. 2 is a flow chart of a particular embodiment of a method of using wireless local area networks to provide mobile communication services to communication devices to relieve a wireless wide area network; and FIG. 3 is a block diagram of a particular embodiment of a general computer system that uses wireless local area networks to provide mobile communication services to communication devices to relieve a wireless wide area network.

IV. DETAILED DESCRIPTION

This disclosure relates generally to a method of using a wireless local area network (e.g., a Wi-Fi network) to provide mobile communication services (e.g., audio, video, text, images, other data, or any combination thereof) to communication devices (e.g., a wireless phone, a smart phone, a portable computing device, or any combination thereof) to relieve demand of a wireless wide area network (e.g., a cellular network). When demand for the mobile communication services from the communication devices of a wireless wide area network exceeds particular limits, the mobile communication services provided by the wireless wide area network may start to deteriorate. To maintain the quality of services, the wireless wide area network may offload certain communication devices from the wireless wide area network and request that a wireless local area network act as a substitute to provide the mobile communication services to the offloaded communication devices. After a period of time, when the demand for the mobile communication services drops below the particular limits, the wireless wide area network may have enough resources to provide the mobile communication services to the offloaded communication devices. The wireless wide area network may then request that the wireless local area network cease providing services to the offloaded communication devices, and the wireless wide area network may resume providing services to the communication devices.

A method includes receiving a performance indicator (e.g., power load or bandwidth available to communication devices of a wireless wide area network) at a first computing device (e.g., a processor) of the wireless wide area network. The first computing device may determine whether the performance indicator satisfies a performance threshold. The wireless wide area network may offload multiple communication devices from the wireless wide area network to a different network when the first computing device determines that the performance indicator does not satisfy the performance threshold. For example, the first computing device may request that a local area network provide the mobile communication services to the offloaded communication devices. A controller of the wireless local area network may enable access points to provide the mobile communication services to the communication devices that are located within a coverage area of the wireless local area network.

Referring to FIG. 1, a block diagram of a particular embodiment of a system that uses wireless local area networks to provide mobile communication services to communication devices to offload a wireless wide area network is disclosed and generally designated 100. In FIG. 1, for purposes of illustration, the system 100 includes a wireless wide area network 101 and two wireless local area networks 102 and 103. In other embodiments, the system 100 may include more than or fewer than two wireless local area networks. The wireless wide area network 101 may be coupled to the wireless local area networks 102 and 103 via a network. The system 100 may enable the wireless wide area network 101 to offload certain communication devices and to activate the wireless local area networks 102 and 103 to provide mobile communication services to the offloaded communication devices.

The wireless wide area network 101 may be a network operated by a business entity (e.g., a cellular carrier) that provides mobile communication services to multiple communication devices, such as exemplary communication devices 104-113, over a wide coverage area. Coverage of the wireless wide area network 101 may be national or regional. The mobile communication services may include transmissions of data (e.g., voice, text, audio, video, images, other data, or any combination thereof) from one communication device to another communication device. In one embodiment, the transmissions may occur within the wireless wide area network 101. In another embodiment, the transmissions may occur between the wireless wide area network 101 and another network (e.g., the wireless local area networks 102 and 103). For example, the other network may include or correspond to a local area network (LAN), a wide area network (WAN), a metropolitan area network (MAN), a public switched telephone network (PSTN), or any combination thereof. The communication devices 104-113 may include any device (e.g., a wireless telephone, a smart phone, a portable computing device, or any combination thereof) that is able to wirelessly receive data from and send data to the wireless wide area network 101. The portable computing device may include a tablet computer, a laptop computer, a netbook computer, a smartbook computer, or other mobile devices.

The wireless wide area network 101 may include a computing facility 114 and base stations 115 and 116. In various embodiments, the wireless wide area network 101 includes more than or fewer than two base stations. The computing facility 114 may be coupled to the base stations 115 and 116. The computing facility 114 may act as a central controller of the wireless wide area network 101. For example, the computing facility 114 may operate in the capacity of a network server. The computing facility 114 may be connected, e.g., using a network, to other computer systems or peripheral devices, such as a video server, a content switch, a switch/router system, or another network device. Each of the base stations 115 and 116 may be configured to transmit data (e.g., audio, video, text, images, other data, or any combination thereof) to and receive data from one or more of the communication devices 104-113 within a coverage area (e.g., 117 and 118) associated with the base stations 115 and 116. Additionally, each of the base stations 115 and 116 may transmit data to and receive data from the wireless wide area network 101 and the computing facility 114.

The computing facility 114 may include any type or number of devices that are configured to accommodate or are compatible with design and operation requirements of the wireless wide area network 101. For example, the computing facility 114 may include a processor, a memory unit, a storage device, input and output (I/O) devices, communications ports, and buses operable to transmit communications within the wireless wide area network 101 or between the wireless wide area network 101 and other networks (e.g., the wireless local area networks 102 and 103 and the Internet). The processor may include a central processing unit (CPU), a graphics processing unit (GPU), a digital signal processor (DSP), hardware or software control logic, another type of device, or any combination thereof. The memory unit may include a volatile memory, a non-volatile memory, or any combination thereof. The volatile memory may include a random access memory (RAM). The non-volatile memory may include a read-only memory, a flash memory, a cache-base memory, a register-based memory, another type of memory, or any combination thereof.

The computing facility 114 may be configured to provide routing control to enable the wireless wide area network 101 to transmit data (e.g., audio, video, text, images, other data, or any combination thereof) within the wireless wide area network 101 or between the wireless wide area network 101 and another network (e.g., another wireless wide area network or the wireless local area networks 102 and 103). In one embodiment, the computing facility 114 may route the data from a communication device (e.g., any of the communication devices 104-113) to another communication device (e.g., any of the communication devices 104-113) within the wireless wide area network 101. In another embodiment, the computing facility 114 may route the data from a communication device (e.g., any of the communication devices 104-113) of the wireless wide area network 101 to another communication device of another network. In a further embodiment, the computing facility 114 may route the data from a communication device of another network to a communication device (e.g., any of the communication devices 104-113) of the wireless wide area network 101.

The memory unit of the computing facility 114 may be configured to store data associated with operation of the wireless wide area network 101. For example, the memory unit may store data associated with locations of the communication devices 104-113 of the wireless wide area network 101. As another example, the memory unit may store data associated with communication addresses (e.g., internet protocol (IP) addresses) of the communication devices. As a further example, the memory unit may store data associated with performance standards that are used by the wireless wide area network 101 to determine whether demand for the mobile communication services from the communication devices 104-113 exceeds a threshold associated with the wireless wide area network 101. The data stored in the memory unit may be updated periodically or occasionally. For example, the memory unit may update the locations of the communication devices 104-113 every fifteen minutes.

When the computing facility 114 receives a request to transmit data to a communication device, the computing facility 114 may retrieve data associated with the location of the communication device from the memory unit and route the data to the communication device. For example, when the request is for transmission of data within the wireless wide area network 101, the computing facility 114 may retrieve data associated with the location of the communication device from the memory unit. The computing facility 114 may route the data to a corresponding base station that provides the mobile communication services to the communication device. The base station may transmit the data to the communication device. As another example, when the request is for transmission of data to a communication device of another network, the computing facility 114 may retrieve data associated with the communication address of the communication device and route the data to the network based on the communication address. Upon receiving the data, the network may route the data to the communication device.

The computing facility 114 may be configured to determine performance information associated with the wireless wide area network 101 periodically (e.g., every fifteen minutes) or occasionally. The performance information may indicate a level of demand for mobile communication services provided by the wireless wide area network 101 during a specific period of time. The performance information may include, correspond to, or be used to determine a first performance indicator. In one embodiment, the first performance indicator includes loading conditions, such as power load (e.g., how much transmit/receive power is needed by the wireless wide area network 101 to support the level of demand) and data rate load (e.g., what data rate is needed by the wireless wide area network 101 to support the level of demand). In another embodiment, the first performance indicator may include bandwidth available to a communication device associated with the wireless wide area network 101 (e.g., any of the communication devices 104-113), which may be determined based on total bandwidth of the wireless wide area network 101 and an amount of demand for bandwidth.

The computing facility 114 may be configured to cause one or more mobile communication devices to be offloaded from the wireless wide area network 101 when the computing facility 114 determines that the demand for the mobile communication services during a specific period of time satisfies a first threshold. The communication devices that are selected to be offloaded may be determined based on a quantity of resources consumed by the communication devices. For example, the computing facility 114 may select one or more communication devices whose total consumption of the resources is largest among the communication devices 104-113. After offloading the selected communication devices, the demand for mobile communication services on the wireless wide area network 101 may drop below the threshold such that the wireless wide area network 101 is able to satisfy the demand with an acceptable quality of service, which may correspond to an acceptable data rate and/or an acceptable delay or communication latency. Therefore, the quality of service provided by the wireless wide area network 101 is maintained. The computing facility 114 may be configured to request wireless local area networks 102 and 103 to provide the mobile communication services as a substitute to the offloaded mobile communication devices that are located within their service coverage area.

When the computing facility 114 determines that a second performance indicator associated with performance information of the wireless wide area network 101 is below a second threshold, the computing facility 114 may request that the wireless local area networks 102 and 103 cease providing the mobile communication services to the offloaded mobile communication devices, and the computing facility 114 may then resume providing the mobile communication services to the offloaded communication devices. A magnitude of the first threshold may or may not be equal to a magnitude of the second threshold. In one embodiment, the magnitude of the second threshold is smaller than the magnitude of the first threshold.

The first performance indicator and the second performance indicator may be determined based on loading conditions (e.g., power load and data rate load) with which the mobile communication devices operate. In another embodiment, the first performance indicator and the second performance indicator may be determined based on bandwidth that the mobile communication devices require to operate. Thus, the first performance indicator may be a same type of parameter as the second performance indicator. Likewise, the first performance indicator may be a different type of parameter from the second performance indicator. The first threshold and the second threshold may be determined based on certain level (e.g., standard and statistics) of locations conditions or bandwidth under which the wireless wide area network 101 is unable to provide a particular quality of service (e.g., a particular data rate or a particular communication latency).

The base stations 115 and 116 may be configured to transmit data to and receive data from one or more communication devices within a coverage area. For example, the base station 115 may provide the mobile communication services to the communication devices 104-108 that are located within the coverage area 117. The base station 116 may provide the mobile communication services to the communication devices 109-113 within the coverage area 118. The base stations 115 and 116 may be coupled with the computing facility 114. Each base station may include, or may be coupled to, a transmission tower (e.g., a transmission tower 129 of the base station 115 and a transmission tower 130 of the base station 116) and a computing device. The computing device of each base station may be configured to process and store data involved in providing the mobile communication services. For example, the computing device may receive and process data associated with usage or demand information and may report the usage or demand information to the computing facility 114.

The wireless local area networks 102 and 103 (e.g., Wi-Fi networks) may provide the mobile communication services to communication devices within corresponding coverage areas 117 and 118. The coverage area of each of the wireless local area networks 102 and 103 may be smaller than the coverage area of the wireless wide area network 101 (e.g., a sum of the coverage areas 117 and 118). Additionally, the wireless local area networks 102 and 103 and the wireless wide area network 101 may use different communication protocols. For example, the wireless local area networks 102 and 103 may use a local area network (LAN) protocol (e.g., Wi-Fi and WiMAX) while the wireless wide area network 101 may use a wide area network (WAN) protocol (e.g., a CDMA protocol, a TDMA protocol, a FDMA protocol, or an OFDMA protocol). Each of the wireless local area networks 102 and 103 may include a central controller and one or more access points. For example, the wireless local area network 102 includes a central controller 123 and access points 119 and 120. The wireless local area network 103 includes a central controller 124 and access points 121 and 122.

The central controllers 123 and 124 may be configured to provide routing. For example, the central controllers 123 and 124 may route data from a communication device to another communication device within the wireless local area networks 102 and 103. As another example, the central controllers 123 and 124 may route the data from a communication device of the wireless local area networks 102 and 103 to another communication device of another network (e.g., the wireless wide area network 101). As a further example, the central controllers 123 and 124 may route the data from a communication device of another network to a communication device of the wireless local area networks 102 and 103.

The central controllers 123 and 124 may also, or in the alternative, be configured to provide access control to the access points. For example, the central controllers 123 and 124 may activate one or more access points within the coverage areas of the wireless local area networks 102 and 103 to provide the mobile communication services to the communication devices. As another example, the central controllers 123 and 124 may deactivate one or more access points that are providing the mobile communication services to the communication devices. As a further example, the central controllers 123 and 124 may configure the access points to provide the mobile communication services to some but not all communication devices within the coverage areas of the wireless local area networks 102 and 103. The central controllers 123 and 124 may include any devices (e.g., computing devices) that accommodate or are compatible with design and operation requirements of the wireless local area networks 102 and 103.

Each of the access points 119-122 may provide the mobile communication services within a corresponding coverage area 125-128. When configured or enabled to do so, each of the access points 119-122 may provide the mobile communication services for one or more communication devices within the corresponding coverage area. For example, when authorized by the wireless wide area network 101, the access point 119 may provide the mobile communication services to one or more communication devices 104-107, the access point 120 may provide the mobile communication services to communication device 108, the access point 121 may provide the mobile communication services to one or more communication devices 109-110, the access point 122 may provide mobile communication services to one or more communication devices 112-113, or any combination thereof.

The central controllers 123 and 124 may receive a request from the wireless wide area network 101 to provide the mobile communication services to certain communication devices (e.g., any of the communication devices 104-113) that are offloaded from the wireless wide area network 101 and that are located within the coverage areas 125-128. The central controllers 123 and 124 may then enable access points (e.g., any of the access points 119-122) associated with the coverage areas in which the offloaded communication devices are located to provide the mobile communication services to the offloaded communication devices. The controllers 123 and 124 may configure a type of the mobile communication services provided to the offloaded communication devices. The controllers 123 and 124 may also, or in the alternative, configure a mechanism of access control that only allows the offloaded communication devices to access the mobile communication services. The central controllers 123 and 124 may receive a request from the wireless wide area network 101 to cease providing the mobile communication services to the offloaded communication devices when the demand for the mobile communication services drops below particular limits. The central controllers 123 and 124 may subsequently disable the access points and cease providing mobile communication services to the offloaded communication devices.

In operation, the wireless wide area network 101 provides the mobile communication services to the communication devices 104-113 and offloads some communication devices to the wireless local area networks 102 and 103 during high usage times. The wireless wide area network 101 (such as the computing facility 114 or the base stations 115 and 116) may periodically (e.g., every fifteen minutes) or occasionally gather demand information (e.g., a performance indicator). In one embodiment, the demand information may include or correspond to information descriptive of loading conditions of the communication devices 104-113. In another embodiment, the demand information may include or correspond to information descriptive of bandwidth required by the communication devices 104-113, the base stations 115 and 116, and the computing facility 114, or any combination thereof, that are using the mobile communication services provided by the wireless wide area network 101. For example, the demand information may include bandwidth required by the base station 115 that is providing the mobile communication services to the communication devices 104-108.

When demand for the mobile communication services from the communication devices 104-113 exceeds a threshold during a first time period, quality of services provided to the communication devices 104-113 may start to deteriorate. The wireless wide area network 101 may then offload certain communication devices 104-113. The communication devices 104-113 that are selected to be offloaded from the wireless wide area network 101 may be determined based on a quantity of resources consumed by the communication devices. For example, the wireless wide area network 101 may select one or more communication devices whose total consumption of the resources is largest among the communication devices 104-113. In another embodiment, the communication devices 104-113 that are selected to be offloaded may be determined by areas in which the communication devices 104-113 are located. For example, when the base station 116 is unable to meet demand for the mobile communication services from the communication devices 109-113, the communication devices to be offloaded may be selected from the communication devices 109-113. After offloading the communication devices, the demand for the mobile communication services may drop below the threshold.

After determining to offload one or more communication devices, the wireless wide area network 101 may request (e.g., via a first instruction) the wireless local area networks 102 and/or 103 to provide the mobile communication services as a substitute for the wireless wide area network 101 to the offloaded communication devices that are located within their coverage areas based on location data of the offloaded communication devices. The wireless wide area network 101 may provide data associated with identities and locations of the offloaded communication devices to the wireless local area networks 102 and 103. The wireless local area networks 102 and 103 may, based on the data provided by the wireless wide area network 101, enable corresponding access points (e.g., any of the access points 119-122) to provide the mobile communication services to the offloaded communication devices that are located within their coverage areas based on location data of the offloaded communication devices. Alternatively, the wireless wide area network 101 may select either the wireless local area network 102 or the wireless local area network 103 to provide the mobile communication services to the offloaded communication devices, depending on which wireless local area network is able to provide a type of the mobile communication services (e.g., text messaging service), most benefits (e.g., one wireless local area network may provide services and/or functions including voice, text, audio, video, images, other data, or any combination thereof while the other wireless local area network may only provide voice service), or any combinations thereof.

The central controllers 123 and 124 of the wireless local area networks 102 and 103 may configure the access points to provide the mobile communication services only to particular communication devices (e.g., using an authorization mechanism). In one embodiment, the access points may include access controls and may provide the mobile communication services to the particular communication devices in response to user authorization information (e.g., usernames and passwords) received at the access points from the communication devices. To illustrate, when a communication device attempts to access an access point, the access point may provide a captive portal login to the communication device as part of a user authentication mechanism. The communication device may provide authentication information to gain access to the mobile communication services.

Subsequently, when the wireless wide area network 101, during a second time period, detects that the wireless wide area network 101 has enough resources to accommodate service requirements of the offloaded communication devices (e.g., after an event at a sports facility has ended), the wireless wide area network 101 may request (e.g., via a second instruction) the wireless local area networks 102 and 103 to cease providing the mobile communication services to the offloaded communication devices. Upon receiving the request, the local area networks 102 and 103 may disable (e.g., turn off or re-configure) the corresponding access points and thus cease providing the mobile communication services to the offloaded communication devices. The wireless wide area network 101 may resume providing the mobile communication services to the offloaded communication devices.

The wireless wide area network 101 may also, or in the alternative, be configured to offload certain communication devices and to request (e.g., via a third instruction) the wireless local area networks 102 and 103 to provide the mobile communication services to the offloaded communication devices in a scheduled manner. For example, the computing facility 114 of the wireless wide area network 101 may schedule to offload certain communication devices at a specific time, on a specific date, or both, and to request, by the computing facility 114 via a network or by service representatives working at the computing facility 114, that the wireless local area networks 102 and 103 provide the mobile communication devices to the communication devices to be offloaded at the specific time, on the specific date, or both. As another example, the computing facility 114 may schedule to offload certain communication devices when a condition is satisfied (e.g., when demand for the mobile communication services supported by a base station exceeds its capacity), and to request that the wireless local area networks 102 and 103 provide the mobile communication services to the communication devices to be offloaded when the condition is satisfied. Upon receiving the request, the wireless local area networks 102 and 103 may enable corresponding access points to provide the mobile communication services to the designated communication devices that are located within coverage areas of the access points based on the schedule.

The computing facility 114 may schedule offloading in a number of ways. In one embodiment, the computing facility 114 may schedule the offloading based on statistics of demand for the mobile communication services in the wireless wide area network 101. The computing facility 114 may determine high demand periods, based on the statistics, during which peak demands (e.g., demand exceeding a threshold) occur, and schedule the offloading for the high demand periods. In another embodiment, the computing facility 114 may schedule the offloading based on collected information. For example, when an event (e.g., an activity at an event venue) is scheduled to occur in an area during a specific time, demand for the mobile communication services during that specific time may exceed the threshold based on a scale of the event. The computing facility 114 may schedule the offloading and request that a wireless local network with coverage of that area provide mobile communication services to the communication devices during, before, or after the event.

Likewise, the wireless wide area network 101 may be configured to request the wireless local area networks 102 and 103 to cease providing the mobile communication services to the offloaded communication devices, and the wireless wide area network 101 then resumes providing the mobile communication services to the offloaded communication devices in a scheduled manner. For example, the wireless wide area network 101 may request that the wireless local area networks 102 and 103 cease providing the mobile communication services to the offloaded communication devices at a specific time, on a specific date, or both, according to a schedule. Upon receiving the request, the wireless local area networks 102 and 103 may disable corresponding access points to cease providing the mobile communication services to the designated communication devices that are located within coverage areas of the access points based on the schedule. As another example, the wireless wide area network 101 may request that the wireless local area networks 102 and 103 schedule to cease providing the mobile communication services to the offloaded communication devices when a condition is satisfied.

The wireless wide area network 101 may be configured to schedule (e.g., via a fourth instruction) the wireless local area networks 102 and 103 to provide the mobile communication services to a specific location. For example, the wireless wide area network 101 may schedule the wireless local area networks 102 and 103 to provide the mobile communication services to the communication devices 104-113 at a specific location (e.g., a stadium where a sports game is to occur) at a specific time on a specific date. Upon receiving the request, the wireless local area networks 102 and 103 may enable corresponding access points to provide the mobile communication services to the communication devices 104-113 of the wireless wide area network 101 based on the schedule (e.g., based on schedule data received from the wireless wide area network 101). For example, if a stadium is located within the coverage area 128 of the access point 122, the wireless wide area network 101 may schedule the wireless local area network 103 to enable the access point 122 to provide the mobile communication services during a specific time period when a sports game or other event is to occur.

Likewise, the wireless wide area network 101 may be configured to schedule the wireless local area networks 102 and 103 to cease providing the mobile communication services to the specific location and to resume providing the communication services to the communication devices 104-113. For example, the wireless wide area network 101 may schedule the wireless local area networks 102 and 103 to cease providing the mobile communication services to the communication devices 104-113 at a specific location at a specific time on a specific date. Upon receiving the request, the wireless local area networks 102 and 103 may disable, via the central controllers 123 and 124, corresponding access points to cease providing the mobile communication services to the communication devices 104-113 of the wireless wide area network 101 based on the schedule data.

FIG. 1 thus illustrates a system 100 that includes a wireless wide area network 101 and multiple wireless local area networks, such as the illustrated wireless local area networks 102 and 103. The system 100 enables the wireless wide area network 101 to offload certain communication devices at particular times (e.g., during a high demand time period) and enables the multiple wireless local area networks 102 and 103 to provide the mobile communication services to the offloaded communication devices. The system 100 enables a mobile communication service provider to provide customers with quality services as well as operate the wireless wide area network 101 in a cost effective manner since many of the resources, such as bandwidth, are unused or underutilized during a normal operation time and addition of resources to accommodate service demand is economically infeasible.

Referring to FIG. 2, a flow chart of a particular embodiment of a method of using wireless local area networks to provide mobile communication services to communication devices to offload a wireless wide area network is disclosed and designated 200. The method 200 may be performed by one or more of the devices or components of FIG. 1.

The method 200 includes a wireless wide area network providing mobile communication services to communication devices, at 201. For example, in FIG. 1, the wireless wide area network 101 provides mobile communication services to the communications devices 104-113. Moving to 202, the wireless wide area network may gather performance information of the wireless wide area network (e.g., periodically or occasionally. The performance information may indicate a level of demand for mobile communication services provided by the wireless wide area network during a specific period of time. The performance information may include, correspond to, or be used to determine a performance indicator. In one embodiment, the performance indicator may be loading conditions (e.g., power load and data rate load). In another embodiment, the performance indicator may be bandwidth available to a communication device associated with the wireless wide area network. For example, in FIG. 1, the wireless wide area network 101 may gather performance information of the wireless wide area network every fifteen minutes.

Advancing to 203, based on the performance information, the wireless wide area network may determine whether demand for the mobile communication services on the wireless wide area network exceeds a first threshold. Proceeding to 204, if the demand for the mobile communication services exceeds the first threshold, the wireless wide area network may offload certain communication devices and request that wireless local area networks provide the mobile communication services as a substitute to the offloaded communication devices. For example, in FIG. 1, the wireless wide area network 101 may offload any of the communication devices 104-113 and request that the wireless local area networks 102 and/or 103 provide the mobile communication services to the offloaded communication devices. When the demand for the mobile communication services does not exceed the first threshold, the wireless wide area network may continue to provide the mobile communication services to the communication devices and gather demand information periodically or occasionally. The communication devices that are selected to be offloaded from the wireless wide area network may be determined based on a quantity of resources consumed by the communication devices. For example, in FIG. 1, the wireless wide area network 101 may select one or more communication devices whose total consumption of the resources is largest among the communication devices 104-113. Upon offloading the communication devices, the demand for the mobile communication services may drop below the limits of resources.

In one embodiment, when the wireless local area networks receive the request to provide the mobile communication services to the designated (offloaded) communication devices, the wireless local area networks may enable corresponding access points to provide the mobile communication services to the offloaded communication devices that are located within their coverage areas. For example, in FIG. 1, the wireless wide area network 101 may provide data associated with identities and locations of the offloaded communication devices to the wireless local area network 102 and 103. The wireless local area networks 102 and 103 may enable corresponding access points (e.g., any of the access points 119-122) to provide the mobile communication services to the offloaded communication devices that are located within their coverage areas.

Moving to 205, the wireless wide area network may continue to provide the mobile communication services to the remaining communication devices and gather demand information of the wireless wide area network periodically or occasionally. Advancing to 206, based on the demand information, the wireless wide area network may determine whether the demand for the mobile communication services exceeds a second threshold (which may be equal to or may be different from the first threshold). If the demand for the mobile communication services exceeds the second threshold, returning to 204, the wireless wide area network may offload additional communication devices and request that the wireless local area network provide the mobile communication services to the offloaded communication devices. Proceeding to 207, if the demand for the mobile communication services does not exceed the second threshold, the wireless wide area network may determine whether the wireless wide area network has enough resources to provide the mobile communication services to the offloaded communication devices.

If the wireless wide area network does not have enough resources to provide the mobile communication services to the offloaded communication devices, the wireless wide area network operates without adjustment and the method 200 returns to 205. Moving to 208, if the wireless wide area network has enough resources to provide the mobile communication services to the offloaded communication devices, the wireless wide area network may request that the wireless local area networks cease providing the mobile communication services to one or more of the offloaded devices, and the wireless wide area network may resume providing services to one or more of the offloaded devices. For example, in FIG. 1, upon receiving the request, the wireless local area networks 102 and 103 may disable the access points (e.g., any of the access points 119-122), which may cease providing the mobile communication services to the offloaded communication devices.

The method 200 may also, or in the alternative, enable a wireless wide area network to offload certain communication devices and to request that wireless local area networks provide the mobile communication services to the offloaded communications devices in a scheduled manner. For example, in FIG. 1, the computing facility 114 may schedule to offload certain communication devices at a specific time, on a specific date, or both, and to request that the wireless local area networks 102 and 103 provide the mobile communication devices to the communication devices to be offloaded at the specific time, on the specific date, or both. As another example, the computing facility 114 may schedule to offload certain communication devices when a condition is satisfied, and to request that the wireless local area networks 102 and 103 provide the mobile communication services to the communication devices to be offloaded when the condition is satisfied. Upon receiving the request, the wireless local networks may provide the mobile communication services to the designated communication devices based on the schedule.

The method 200 may also, or in the alternative, enable a wireless wide area network to request that wireless local area networks cease providing the mobile communication services to the offloaded communication devices and resume providing the mobile communication services to the offloaded communication devices in a scheduled manner. For example, the wireless wide area network 101 may request the wireless local area networks 102 and 103 to schedule to cease providing the mobile communication services to the offloaded communication devices at a specific time, on a specific date, or both. As another example, the wireless wide area network 101 may request the wireless local area networks 102 and 103 to schedule to cease providing the mobile communication services to the offloaded communication devices when a condition is satisfied. Upon receiving the request, the wireless local area networks 102 and 103 may cease providing the mobile communication services to the designated communication devices based on the schedule.

The method 200 may also, or in the alternative, enable a wireless wide area network to schedule wireless local area networks to provide the mobile communication services to a specific location. For example, the wireless wide area network 101 may schedule the wireless local area networks 102 and 103 to provide the mobile communication services to the communication devices 104-113 at a specific location (e.g., a stadium where a sports game is to occur) at a specific time on a specific date. Upon receiving the request, the wireless local area networks 102 and 103 may enable corresponding access points to provide the mobile communication services to the communication devices 104-113 of the wireless wide area network 101 based on the schedule.

The method 200 may also, or in the alternative, enable a wireless wide area network to schedule wireless local area networks to cease providing the mobile communication services to the specific location and to resume providing the communication services to the communication devices. For example, the wireless wide area network 101 may schedule the wireless local area networks 102 and 103 and cease providing the mobile communication services to the communication devices 104-113 at a specific location at a specific time on a specific date. Upon receiving the request, the wireless local area networks 102 and 103 may disable corresponding access points to cease providing the mobile communication services to the communication devices 104-113 of the wireless wide area network 101 based on the schedule.

The method 200 of FIG. 2 may thus enable a wireless wide area network to offload communication devices and enable wireless local area networks to provide mobile communication services to the offloaded communication devices as a substitute when demand on resources of the wireless wide area network exceeds a threshold, in accordance with a schedule, and/or based on a specific location.

Referring to FIG. 3, a block diagram of a particular embodiment of a general computer system that uses wireless local area networks to provide mobile communication services to communication devices to relieve a wireless wide area network is disclosed and generally designated 300. The computer system 300 may include a set of instructions that can be executed to cause the computer system 300 to perform any one or more of the methods or computer based functions disclosed herein. The computer system 300 may operate as a standalone device or may be connected, e.g., using a network, to other computer systems or peripheral devices. For example, the computer system 300 may include, be included within, or correspond to one or more of the components of the system 100, the computing facility 114 of FIG. 1, the base stations 115 and 116 of FIG. 1, the central controllers 123 and 124 of FIG. 1, the access points 119-122 of FIG. 1, the communication devices 104-113, or a combination thereof described with reference to FIG. 1.

In a networked deployment, the computer system 300 may operate in the capacity of a server or as a client user computer in a server-client user network environment, or as a peer computer system in a peer-to-peer (or distributed) network environment. The computer system 300 may also be implemented as or incorporated into various devices, such as a personal computer (PC), a tablet, a set-top box (STB), a personal digital assistant (PDA), a customer premises equipment device, an endpoint device, a mobile device, a palmtop computer, a laptop computer, a desktop computer, a communications device, a wireless telephone, a web appliance, or any other machine capable of executing a set of instructions (sequential or otherwise) that specify actions to be taken by that machine. In a particular embodiment, the computer system 300 may be implemented using electronic devices that provide video, audio, or data communication. Further, while one computer system 300 is illustrated, the term "system" shall also be taken to include any collection of systems or sub-systems that individually or jointly execute a set, or multiple sets, of instructions to perform one or more computer functions.

As illustrated in FIG. 3, the computer system 300 includes a processor 302, e.g., a central processing unit (CPU), a graphics processing unit (GPU), or both. The processor 302 may be one or more components (e.g., a processor) of the computing facility 114, one or more components (e.g., a processor) of the base stations 115 and 116, one or more components (e.g., a processor) of the central controllers 123 and 124, one or more components (e.g., a processor) of the access points 119-122, or a combination thereof. In a particular embodiment, the processor 302 may include multiple processors. For example, the processor 302 may include distributed processors, parallel processors, or both. The multiple processors may be included in, or coupled to, a single device or multiple devices. The processor 302 may be utilized in supporting a virtualized computing environment. In a particular embodiment, the virtualized computing environment may support one or more virtual machines representing computers, servers, or other computing devices. In such virtual machines, components such as processors and storage devices may be virtualized or logically represented. In a particular embodiment, the processor 302 may be incorporated in or implemented by an application specific integrated circuit (ASIC) or a programmable gate array (PGA) (e.g., a field programmable gate array (FPGA)).

Moreover, the computer system 300 may include a main memory 304 and a static memory 306, which can communicate with each other via a bus 308. For example, the main memory 304 may be one or more components (e.g., a memory) of the computing facility 114, one or more components (e.g., a memory) of the base stations 115 and 116, one or more components of the central controllers 123 and 124, one or more components of the access points 119-122, or a combination thereof. As shown, the computer system 300 may further include a video display unit 310, such as a liquid crystal display (LCD), a flat panel display, a solid state display, or a lamp assembly of a projection system. Additionally, the computer system 300 may include an input device 312, such as a keyboard, and a cursor control device 314, such as a mouse. The computer system 300 may also include a drive unit 316, a signal generation device 318, such as a speaker or remote control, and a network interface device 320. In certain embodiments, the computer system 300 may include fewer than all of the above described components (e.g., a server may not include a mouse or a remote control).

In a particular embodiment, as depicted in FIG. 3, the drive unit 316 may include a computer-readable storage device 322 in which one or more sets of instructions 324, e.g. software, can be embedded. The computer-readable storage device 322 may include random access memory (RAM), read-only memory (ROM), programmable read-only memory (PROM), erasable PROM (EPROM), electrically erasable PROM (EEPROM), register(s), a hard disk, a removable disk, a compact disc read-only memory (CD-ROM), other optical disk storage, a magnetic disk storage, magnetic storage devices, or any other storage device that can be used to store program code in the form of instructions or data and that can be accessed by a computer and/or processor. The computer-readable storage device is an article of manufacture that is not a signal. The instructions 324 may be executable by the processor 302 to perform one or more functions or methods described herein, such as the method described with reference to FIG. 2. In a particular embodiment, the instructions 324 may reside completely, or at least partially, within the main memory 304, the static memory 306, and/or within the processor 302 during execution by the computer system 300. The processor 302 may execute the instructions 324 to perform operations corresponding to one or more of the methods or logic as described herein. The processor 302 may perform the operations directly, or the processor 302 may facilitate, direct, or cooperate with another device or component to perform the operations.

In an alternative embodiment, dedicated hardware implementations, such as application specific integrated circuits, programmable logic arrays and other hardware devices, may be constructed to implement one or more of the methods described herein. Various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations may include distributed processing, component/object distributed processing, and parallel processing. Alternatively, virtual computer system processing may be constructed to implement one or more of the methods or functionality as described herein.

A computer-readable storage device 322 stores the instructions 324 and a processor (e.g., the processor 302) executes the instructions 324, so that a device connected to a network 326 may communicate voice, video, or data over the network 326. For example, the computer-readable storage device 322 device may include or be included within one or more of the components of the computing facility 114, one or more components of the base stations 115 and 116, one or more components of the central controllers 123 and 124, one or more components of the access points 119-122, or a combination thereof described with reference to FIG. 1. While the computer-readable storage device 322 is shown to be a single device, the computer-readable storage device 322 may include multiple devices. The computer-readable storage device 322 is capable of storing a set of instructions for execution by a processor to cause a computer system to perform any one or more of the methods or operations disclosed herein.

In a particular non-limiting, exemplary embodiment, the computer-readable storage device 322 may include a solid-state memory such as a memory card or other package that houses one or more non-volatile read-only memories. Further, the computer-readable storage device 322 may be a random access memory or other volatile re-writable memory. Additionally, the computer-readable storage device 322 may include a magneto-optical or optical device, such as a disk, tapes, or other storage device.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, at a first computing device, first data associated with a performance indicator of a wireless wide area network for a first time period;
   determining, at the first computing device, whether the performance indicator determined from the first data for the first time period satisfies a performance threshold; and
   based on determining that the performance indicator does not satisfy the performance threshold:
      identifying a first communication device which consumes a greater quantity of resources of the wireless wide area network than other communication devices utilizing the wireless wide area network;
      offloading the first communication device from the wireless wide area network; and
      sending a first instruction from the first computing device to a second computing device, the first instruction configured to cause the second computing device to enable a first access point to provide mobile communication services to the first communication device via a first wireless local area network.

2. The method of claim 1, further comprising:
   receiving, at the first computing device, second data associated with the performance indicator for a second time period;
   determining, at the first computing device, whether the performance indicator determined from the second data for the second time period satisfies the performance threshold; and
   based on determining that the performance indicator satisfies the performance threshold:
      sending a second instruction to the second computing device, the second instruction configured to cause the second computing device to enable the first access point to cease providing the mobile communication services to the first communication device; and
      sending a third instruction to a base station of the wireless wide area network to enable the base station to provide the mobile communication services to the first communication device.

3. The method of claim 1, wherein the performance indicator corresponds to a measure of quality of services of the wireless wide area network, and wherein the measure of quality of service includes data rate and delay.

4. The method of claim 1, wherein the performance indicator corresponds to a measure of power loading of a communication device of the wireless wide area network.

5. The method of claim 1, wherein the performance indicator corresponds to a measure of bandwidth available to a communication device of the wireless wide area network.

6. The method of claim 1, wherein the first computing device includes a processor and comprises a network server of the wireless wide area network, and wherein the second computing device comprises a central controller associated with the first wireless local area network.

7. The method of claim 1, wherein the first communication device is located within a coverage area of the first access point.

8. The method of claim 1, wherein the first access point includes access controls such that the first access point only provides the mobile communication services to the first communication device designated in the first instruction, and wherein the access controls include a user authentication mechanism.

9. The method of claim 1, further comprising:
receiving schedule data at the first computing device; and
sending a third instruction to the second computing device to enable a second access point to provide the mobile communication services to a second communication device at a third time, on a first date, or both based on the schedule data, and to cause the second access point to cease providing mobile communication services to the second communication device at a fourth time, on a second date, or both based on the schedule data.

10. The method of claim 9, wherein the second access point supports the first wireless local area network.

11. The method of claim 9, wherein the second access point supports a second wireless local area network.

12. The method of claim 9, wherein the second access point includes access controls such that the second access point only provides the mobile communication services to the second communication device designated in the third instruction, and wherein the access controls include a user authentication mechanism.

13. The method of claim 1, further comprising:
receiving schedule data at the first computing device, wherein the schedule data indicates that at a fifth time, on a third date, or both, a third access point is to be enabled, and at a sixth time, on a fourth date, or both, the third access point is to be disabled; and
sending a fourth instruction to the second computing device to enable the third access point to provide the mobile communication services to communication devices of the wireless wide area network at the fifth time, on the third date, or both, and to cause the third access point to cease providing mobile communication services at the sixth time, on the fourth date, or both.

14. A computer-readable storage device comprising instructions that, when executed by a processor, cause the processor to perform operations comprising:
receiving, at a first computing device, first data associated with a first performance indicator of a wireless wide area network for a first time period;
determining, at the first computing device, whether the first performance indicator determined from the first data for the first time period satisfies a first performance threshold; and
based on determining that the first performance indicator does not satisfy the performance threshold:
identifying a first communication device which consumes a greater quantity of resources of the wireless wide area network than other communication devices utilizing the wireless wide area network;
offloading the first communication device from the wireless wide area network; and
sending a first instruction to a second computing device, wherein, in response to the first instruction, the second computing device enables a first access point to provide mobile communication services to the first communication device.

15. The computer-readable storage device of claim 14, wherein the operations further comprise:
receiving, at the first computing device, second data associated with a second performance indicator for a second time period;
determining, at the first computing device, whether the second performance indicator determined from the second data for the second time period satisfies a second performance threshold; and
based on determining that the second performance indicator from the second data satisfies the second performance threshold, sending a second instruction to the second computing device, wherein, in response to the second instruction, the second computing device causes the first access point to cease providing the mobile communication services to the first communication device and the wireless wide area network resumes providing the mobile communication services to the first communication device.

16. The computer-readable storage device of claim 15, wherein the second performance indicator is a same type of loading condition parameter as the first performance indicator.

17. The computer-readable storage device of claim 14, wherein the operations further comprise:
receiving schedule data at the first computing device; and
sending a third instruction to the second computing device to enable a second access point to provide the mobile communication services to a second communication device at a third time, on a first date, or both based on the schedule data, and to cause the second access point to cease providing mobile communication services to the second communication device at a fourth time, on a second date, or both based on the schedule data.

18. The computer-readable storage device of claim 14, wherein the operations further comprise:
receiving schedule data at the first computing device, wherein the schedule data indicates that at a fifth time, on a third date, or both, a third access point is to be enabled, and at a sixth time, on a fourth date, or both, the third access point is to be disabled; and
sending a fourth instruction to the second computing device to enable the third access point to provide the mobile communication services to communication devices of the wireless wide area network at the fifth time, on the third date, or both, and to cause the third access point to cease providing mobile communication services at the sixth time, on the fourth date, or both.

19. An apparatus, comprising:
a controller configured to receive a first instruction and a second instruction, wherein the first instruction enables an access point to provide mobile communication services to a communication device and wherein the second instruction causes the access point to cease providing the mobile communication services to the communication device,
wherein the first instruction is sent from a first computing device responsive to the first computing device performing operations comprising: receiving first data associated with a performance indicator of a wireless wide area network for a first time period, determining that the communication device consumes a greater quantity of resources of the wireless wide area network than other communication devices utilizing the wireless wide area network in response to the performance indicator determined from the first data for the first time period not satisfying a performance threshold, and offloading the communication device from the wireless wide area network, and
wherein the second instruction is sent from the first computing device responsive to the first computing device receiving second data associated with the performance indicator for a second time period and determines that the performance indicator satisfies the performance threshold.

20. The apparatus of claim 19,
wherein the controller is further configured to receive a third instruction and a fourth instruction, to enable the access point, based on the third instruction, and to disable the access point based on the fourth instruction,
wherein the third instruction is sent from the first computing device when the first computing device receives first schedule data indicating that the access point is to be enabled at a first particular time, a first particular date, or both, and
wherein the fourth instruction is sent from the first computing device when the first computing device receives second schedule data indicating that the access point is to be disabled at a second particular time, a second particular date, or both.

* * * * *